(12) United States Patent
Choi et al.

(10) Patent No.: US 12,384,374 B2
(45) Date of Patent: Aug. 12, 2025

(54) APPARATUS FOR GENERATING U-TURN PATH OF VEHICLE AND METHOD THEREOF

(71) Applicants: Hyundai Motor Company, Seoul (KR); Kia Corporation, Seoul (KR)

(72) Inventors: Sung Woo Choi, Seoul (KR); Su Jin Han, Seoul (KR); Su Young Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 352 days.

(21) Appl. No.: 18/049,335

(22) Filed: Oct. 25, 2022

(65) Prior Publication Data

US 2023/0339468 A1 Oct. 26, 2023

(30) Foreign Application Priority Data

Apr. 26, 2022 (KR) .................. 10-2022-0051474

(51) Int. Cl.
  *B60W 30/18* (2012.01)
  *B60W 30/09* (2012.01)
  *B60W 60/00* (2020.01)

(52) U.S. Cl.
  CPC ...... *B60W 30/18145* (2013.01); *B60W 30/09* (2013.01); *B60W 60/0015* (2020.02); *B60W 2554/801* (2020.02); *B60W 2720/24* (2013.01)

(58) Field of Classification Search
  CPC ........... B60W 30/18145; B60W 30/09; B60W 60/0015; B60W 2554/801;
  (Continued)

(56) References Cited

U.S. PATENT DOCUMENTS

| 2015/0198953 A1 | 7/2015 | Peake et al. |
| 2016/0052546 A1 | 2/2016 | Arakane et al. |

(Continued)

FOREIGN PATENT DOCUMENTS

| JP | 2006190237 A | 7/2006 | |
| JP | 2009157490 A | * 7/2009 | ............. B60K 35/00 |

OTHER PUBLICATIONS

R. He et al., "TDR-OBCA: A Reliable Planner for Autonomous Driving in Free-Space Environment," 2021 American Control Conference (ACC), New Orleans, LA, USA, 2021, pp. 2927-2934 (Year: 2021).*

(Continued)

*Primary Examiner* — Peter D Nolan
*Assistant Examiner* — Ana D Thomas
(74) *Attorney, Agent, or Firm* — SLATER MATSIL, LLP

(57) ABSTRACT

An embodiment apparatus for generating a U-turn path of a vehicle includes a path generator provided in the vehicle and configured to determine a deflection direction and a deflection distance to avoid a collision during a U-turn process, the deflection direction and the deflection distance being based on a minimum turning radius according to a specific reference point of the vehicle and to generate the U-turn path in which the deflection direction and the deflection distance are reflected, and a controller configured to control autonomous driving of the vehicle to follow the generated U-turn path.

18 Claims, 16 Drawing Sheets

(58) Field of Classification Search
CPC ........... B60W 2720/24; B60W 60/001; B60W 30/095; B60W 30/0953; B60W 30/0956; B60W 40/10; B60W 50/00; B60W 60/0011; B60W 30/08; B60W 30/10; B60W 2552/50; B60W 2554/20; B60W 2554/40

See application file for complete search history.

(56) References Cited

U.S. PATENT DOCUMENTS

| | | |
|---|---|---|
| 2017/0247032 A1 | 8/2017 | Lee et al. |
| 2019/0009778 A1 | 1/2019 | Schein et al. |
| 2019/0033874 A1 | 1/2019 | Berkemeier |
| 2021/0123750 A1 | 4/2021 | Im et al. |
| 2023/0097364 A1* | 3/2023 | Li .................. B60W 30/18154 701/1 |

OTHER PUBLICATIONS

Myung Wook Park, Sang Woo Lee and Wooyong Han, "Development of lateral control module for zone(u-turn) maneuver of vehicle/driver cooperative autonomous driving system," 2016 IEEE Transportation Electrification Conference and Expo, Asia-Pacific (ITEC Asia-Pacific), Busan, 2016, pp. 908-912 (Year: 2016).*

H. Yin, J. Jiang, P. Liu and S. Tang, "Application of improved RRT algorithm in the U-turn of vehicle," 2021 China Automation Congress (CAC), Beijing, China, 2021, pp. 891-896 (Year: 2021).*

* cited by examiner

APPARATUS FOR GENERATING U-TURN PATH OF VEHICLE AND METHOD THEREOF

CROSS-REFERENCE TO RELATED APPLICATIONS

This application claims the benefit of Korean Patent Application No. 10-2022-0051474, filed on Apr. 26, 2022, which application is hereby incorporated herein by reference.

TECHNICAL FIELD

The present disclosure relates to an apparatus for generating a U-turn path of a vehicle and a method thereof.

BACKGROUND

An autonomous vehicle is a vehicle loaded with an autonomous driving technology capable of performing driving, braking, and steering on behalf of its driver to reduce the fatigue of the driver. The autonomous vehicle may generate various paths in a driving situation and may follow the various paths to perform autonomous driving. A U-turn path is also included in such various paths.

However, an existing technology generates a U-shaped path in which a kinematic characteristic of the vehicle is not considered and follows the generated U-shaped path to perform autonomous driving. The U-shaped path of the vehicle is a path based on the center of a rear wheel axle of the vehicle when the vehicle makes a U-turn and is not a path based on a center point of a front bumper. When the vehicle makes a U-turn on a narrow road along the U-shaped path in which the kinematic characteristic of the vehicle is not considered, a situation where the vehicle collides with a boundary object such as a curb stone at an opposite side may frequently occur. Thus, there is a need to develop a technology for generating a path the autonomous vehicle may follow to address such a problem with regard to a kinematic characteristic of the autonomous vehicle and make a U-turn without reversing the autonomous vehicle.

SUMMARY

The present disclosure relates to an apparatus for generating a U-turn path of a vehicle and a method thereof. Particular embodiments relate to an apparatus and a method for generating a following U-turn path during autonomous driving.

Embodiments of the present disclosure can solve problems occurring in the prior art while advantages achieved by the prior art are maintained intact.

An embodiment of the present disclosure provides an apparatus and a method for generating a following U-turn path during autonomous driving.

Another embodiment of the present disclosure provides an apparatus and a method for generating a U-turn path considering a kinematic characteristic of an autonomous vehicle.

Another embodiment of the present disclosure provides an apparatus for generating a U-turn path of a vehicle to prevent a collision with a boundary object such as a curb stone at an opposite side during a U-turn process of an autonomous vehicle and a method thereof.

Another embodiment of the present disclosure provides an apparatus for generating a U-turn path of a vehicle to prevent a collision with an obstacle which invades a lane where a U-turn of an autonomous vehicle is started, during a U-turn process of the autonomous vehicle, when there is the obstacle, and a method thereof.

Another embodiment of the present disclosure provides an apparatus for generating a U-turn path of a vehicle to match a path generation reference point with a following control reference point and a method thereof.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, an apparatus for generating a U-turn path of a vehicle may include a path generator provided in the vehicle to determine a deflection direction and a deflection distance such that a collision does not occur during a U-turn process, based on a minimum turning radius according to one or more specific reference points of the vehicle and to generate a U-turn path in which the deflection direction and the deflection distance are reflected and a controller that controls autonomous driving of the vehicle to follow the generated U-turn path.

In an embodiment, the path generator may determine a risk of collision with an outer boundary object of a road on which the vehicle travels after making a U-turn, based on the minimum turning radius, and may determine the deflection direction as an outer direction of the road on which the vehicle is traveling, when it is determined that there is the risk of collision with the outer boundary object of the road on which the vehicle travels after making the U-turn.

In an embodiment, the path generator may calculate a distance invaded by the vehicle in an inner direction of the road on which the vehicle is traveling during the U-turn process, based on the minimum turning radius, and may compare the distance invaded by the vehicle in the inner direction of the road on which the vehicle is traveling during the U-turn process with a lateral distance to the outer boundary object of the road on which the vehicle travels after making the U-turn to determine the risk of collision with the outer boundary object of the road on which the vehicle travels after making the U-turn.

In an embodiment, the path generator may calculate a distance invaded by the vehicle in an inner direction of the road on which the vehicle is traveling during the U-turn process, based on the minimum turning radius, and may calculate the deflection distance, based on a difference between the distance invaded by the vehicle in the inner direction of the road on which the vehicle is traveling during the U-turn process and a lateral distance to the outer boundary object of the road on which the vehicle travels after making the U-turn.

In an embodiment, the one or more specific reference points may include a corner point at a side opposite to the U-turn on a front bumper of the vehicle.

In an embodiment, the path generator may set a value, obtained by subtracting a half of a width of the vehicle from a half of a width of a lane where the vehicle starts to make a U-turn, to a maximum value of the deflection distance.

In an embodiment, the path generator may calculate a distance invaded by the vehicle in the outer direction of the road on which the vehicle is traveling during the U-turn process, based on the minimum turning radius, and may set a value, obtained by subtracting a half of a width of the vehicle and a distance invaded by the vehicle in the outer direction of the road on which the vehicle is traveling during the U-turn process from a half of a width of a lane where the vehicle starts to make a U-turn, to a maximum value of the deflection distance.

In an embodiment, the path generator may determine a risk of collision with an obstacle in a direction opposite to a U-turn, based on the minimum turning radius of the vehicle, and may determine the deflection direction as an inner direction of a road on which the vehicle is traveling, when it is determined that there is the risk of collision with the obstacle in the direction opposite to the U-turn.

In an embodiment, the path generator may calculate a distance invaded by the vehicle in an outer direction of a road on which the vehicle is traveling during the U-turn process, based on the minimum turning radius, and may compare the distance invaded by the vehicle in the outer direction of the road on which the vehicle is traveling during the U-turn process with a lateral distance to the obstacle in the direction opposite to the U-turn to determine the risk of collision with the obstacle in the direction opposite to the U-turn.

In an embodiment, the path generator may calculate a distance invaded by the vehicle in an outer direction of a road on which the vehicle is traveling during the U-turn process, based on the minimum turning radius, and may calculate the deflection distance, based on a difference between the distance invaded by the vehicle in the outer direction of the road on which the vehicle is traveling during the U-turn process and a lateral distance to the obstacle in the direction opposite to the U-turn.

In an embodiment, the one or more specific reference points may include a corner point at a side opposite to the U-turn on a rear bumper of the vehicle.

In an embodiment, the path generator may calculate a distance invaded by the vehicle in an inner direction of the road on which the vehicle is traveling during the U-turn process, based on the minimum turning radius, and may compare the distance invaded by the vehicle in the inner direction of the road on which the vehicle is traveling during the U-turn process with a value obtained by subtracting the deflection distance from a lateral distance to an outer boundary object of the road on which the vehicle travels after making a U-turn to determine a risk of collision with the outer boundary object of the road on which the vehicle travels after making the U-turn.

In an embodiment, the path generator may generate an arc path, based on the minimum turning radius on the basis of the center of a rear wheel axle of the vehicle, and may generate the U-turn path, in which the deflection direction and the deflection distance are reflected, on the basis of a path following control reference point of the vehicle, based on the generated are path.

According to another embodiment of the present disclosure, a method for generating a U-turn path of a vehicle may include determining, by a path generator provided in the vehicle, a deflection direction and a deflection distance such that a collision does not occur during a U-turn process, based on a minimum turning radius according to one or more specific reference points of the vehicle, generating, by the path generator, a U-turn path in which the deflection direction and the deflection distance are reflected, and controlling, by a controller, autonomous driving of the vehicle to follow the generated U-turn path.

In an embodiment, the determining of the deflection direction and the deflection distance such that the collision does not occur during the U-turn process by the path generator may include determining, by the path generator, a risk of collision with an outer boundary object of a road on which the vehicle travels after making a U-turn, based on the minimum turning radius, and determining, by the path generator, the deflection direction as an outer direction of the road on which the vehicle is traveling, when it is determined that there is the risk of collision with the outer boundary object of the road on which the vehicle travels after making the U-turn.

In an embodiment, the determining of the risk of collision with the outer boundary object of the road on which the vehicle travels after making the U-turn by the path generator may include calculating, by the path generator, a distance invaded by the vehicle in an inner direction of the road on which the vehicle is traveling during the U-turn process, based on the minimum turning radius, and comparing, by the path generator, the distance invaded by the vehicle in the inner direction of the road on which the vehicle is traveling during the U-turn process with a lateral distance to the outer boundary object of the road on which the vehicle travels after making the U-turn to determine the risk of collision with the outer boundary object of the road on which the vehicle travels after making the U-turn.

In an embodiment, the determining of the deflection direction and the deflection distance such that the collision does not occur during the U-turn process by the path generator may further include calculating, by the path generator, a distance invaded by the vehicle in an inner direction of the road on which the vehicle is traveling during the U-turn process, based on the minimum turning radius, and calculating, by the path generator, the deflection distance, based on a difference between the distance invaded by the vehicle in the inner direction of the road on which the vehicle is traveling during the U-turn process and a lateral distance to the outer boundary object of the road on which the vehicle travels after making the U-turn.

In an embodiment, the determining of the deflection direction and the deflection distance such that the collision does not occur during the U-turn process by the path generator may include determining, by the path generator, a risk of collision with an obstacle in a direction opposite to a U-turn, based on the minimum turning radius of the vehicle, and determining, by the path generator, the deflection direction as an inner direction of a road on which the vehicle is traveling, when it is determined that there is the risk of collision with the obstacle in the direction opposite to the U-turn.

In an embodiment, the determining of the risk of collision with the obstacle in the direction opposite to the U-turn by the path generator may include calculating, by the path generator, a distance invaded by the vehicle in an outer direction of the road on which the vehicle is traveling during the U-turn process, based on the minimum turning radius, and comparing, by the path generator, the distance invaded by the vehicle in the outer direction of the road on which the vehicle is traveling during the U-turn process with a lateral distance to the obstacle in the direction opposite to the U-turn to determine the risk of collision with the obstacle in the direction opposite to the U-turn.

In an embodiment, the determining of the deflection direction and the deflection distance such that the collision does not occur during the U-turn process by the path generator further may include calculating, by the path generator, a distance invaded by the vehicle in an outer direction of the road on which the vehicle is traveling during the U-turn process, based on the minimum turning radius, and calculating, by the path generator, the deflection distance, based on a difference between the distance invaded by the vehicle in the outer direction of the road on which the vehicle is traveling during the U-turn process and a lateral distance to the obstacle in the direction opposite to the U-turn.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
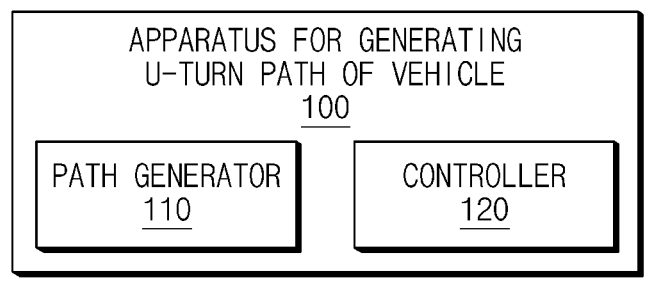
FIG. 1 is a block diagram illustrating an apparatus for generating a U-turn path of a vehicle according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be omitted in order not to unnecessarily obscure the gist of embodiments of the present disclosure.

In describing the components of the embodiments according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 14.

FIG. 1 is a block diagram illustrating an apparatus for generating a U-turn path of a vehicle according to an embodiment of the present disclosure.

An apparatus 100 for generating a U-turn path of a vehicle according to an embodiment of the present disclosure may be implemented inside or outside the vehicle. In this case, the apparatus 100 for generating the U-turn path of the vehicle may be integrally configured with control units in the vehicle or may be implemented as a separate hardware device to be connected with the control units of the vehicle by a connection means.

As an example, the apparatus 100 for generating the U-turn path of the vehicle may be integrally configured with the vehicle or may be implemented as a configuration independent of the vehicle in the form of being installed/attached to the vehicle. Alternatively, a part of the apparatus 100 for generating the U-turn path of the vehicle may be integrally configured with the vehicle or the other may be implemented as a configuration independent of the vehicle in the form of being installed/attached to the vehicle.

Referring to FIG. 1, the apparatus 100 for generating the U-turn path of the vehicle may include a path generator 110 and a controller 120.

The path generator 110 and the controller 120 may include a processor which performs data processing and/or calculation described below. Furthermore, the path generator 110 and the controller 120 may include a memory which stores data or an algorithm required in a process of performing data processing and/or calculation.

The processor which may be included in the path generator 110 and the controller 120 may be an electric circuit which executes a command of software. For example, the processor included in the path generator 110 and the controller 120 may be an electronic control unit (ECU), a micro controller unit (MCU), or another sub-controller.

The memory which may be included in the path generator 110 and the controller 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The path generator 110 may be provided in the vehicle to determine a deflection direction and a deflection distance such that a collision does not occur during a U-turn process, based on a minimum turning radius according to one or more specific reference points of the vehicle.

As an example, the specific reference point may include a corner point at a side opposite to the U-turn on a front bumper of the vehicle or a corner point at a side opposite to the U-turn on a rear bumper of the vehicle.

As an example, assuming that the vehicle makes a U-turn depending on a maximum steering angle, the path generator 110 may determine a deflection direction and a deflection distance such that a collision does not occur during a U-turn process, based on the minimum turning radius of the specific reference point of the vehicle, on the basis of the center of an arc drawn by the vehicle during the U-turn process.

As an example, in the process of determining the deflection direction and the deflection distance, the path generator 110 may use information about a surrounding object detected by means of a sensor or a camera provided in the vehicle.

As an example, in the process of determining the deflection direction and the deflection distance, the path generator 110 may use information about a high definition map around the vehicle, which is stored in a memory of the vehicle or is received through a communication module of the vehicle.

As an example, the path generator 110 may determine a risk of collision with an outer boundary object of a road on which the vehicle travels after making a U-turn. When it is determined that there is the risk of collision with the outer boundary object of the road on which the vehicle travels after making the U-turn, the path generator 110 may determine the deflection direction as an outer direction of the road on which the vehicle is traveling.

When the width of a road where the U-turn is ended, which is a road in a direction opposite to the lane on which the vehicle is currently traveling, is narrow and when the vehicle makes a U-turn while traveling along the center of the lane without deflection in a lateral direction, a collision of a road boundary object such as a curb stone at a side opposite to the vehicle (or in a U-turn direction of the vehicle) may occur during the U-turn process.

As an example, assuming that the vehicle makes a U-turn while traveling along the center of the lane without deflection in the lateral direction, the path generator 110 may determine a risk of collision with an outer boundary object of a road on which the vehicle travels after making the U-turn.

To determine the risk of collision with the road boundary object such as the curb stone at the side opposite to the vehicle (or in a U-turn direction of the vehicle) during the U-turn process, the path generator 110 may identify whether a path drawn along a minimum turning radius by the outermost point of the vehicle on the basis of the center of an arc drawn by the vehicle during the U-turn process overlaps with the road boundary object such as the curb stone at the opposite side (or in the U-turn direction).

As an example, the outermost point of the vehicle on the basis of the center of the arc drawn by the vehicle during the U-turn process may be a corner point at a side opposite to the U-turn on the front bumper of the vehicle.

When the path drawn along the minimum turning radius by the outermost point of the vehicle overlaps with the road boundary object such as the curb stone at the opposite side (or in the U-turn direction), the path generator 110 may determine that there is the risk of collision with the outer boundary object of the road on which the vehicle travels after making the U-turn.

As an example, the path generator 110 may calculate a distance invaded by the vehicle in an inner direction of the road on which the vehicle is traveling during the U-turn process, based on the minimum turning radius, and may compare the distance invaded by the vehicle in the inner direction of the road on which the vehicle is traveling during the U-turn process with a lateral distance to the outer boundary object of the road on which the vehicle travels after making the U-turn to determine the risk of collision with the outer boundary object of the road on which the vehicle travels after making the U-turn.

A description will be given in detail below of contents where the path generator 110 calculates the distance invaded by the vehicle in the inner direction of the road on which the vehicle is traveling during the U-turn process and compares the distance invaded by the vehicle in the inner direction of the road on which the vehicle is traveling during the U-turn process with the lateral distance to the outer boundary object of the road on which the vehicle travels after making the U-turn to determine the risk of collision with the outer boundary object of the road on which the vehicle travels after making the U-turn with reference to FIG. 2.

When determining the deflection direction as the outer direction of the road on which the vehicle is traveling because there is the risk of collision with the outer boundary object of the road on which the vehicle travels after making the U-turn, the path generator 110 may calculate a deflection distance in the outer direction of the road on which the vehicle is traveling.

As an example, the path generator 110 may calculate a distance invaded by the vehicle in an inner direction of the road on which the vehicle is traveling during the U-turn process, based on the minimum turning radius, and may calculate the deflection distance, based on a difference between the distance invaded by the vehicle in the inner direction of the road on which the vehicle is traveling during the U-turn process and the lateral distance to the outer boundary object of the road on which the vehicle travels after making the U-turn.

As an example, the path generator 110 may determine the difference between the distance invaded by the vehicle in the inner direction of the road on which the vehicle is traveling during the U-turn process and the lateral distance to the outer boundary object of the road on which the vehicle travels after making the U-turn as the deflection distance or may determine a distance, obtained by adding a predetermined specific margin to the difference between the distance invaded by the vehicle in the inner direction of the road on which the vehicle is traveling during the U-turn process and the lateral distance to the outer boundary object of the road on which the vehicle travels after making the U-turn, as the deflection distance.

A description will be given in detail below of contents where the path generator 110 calculates the distance invaded by the vehicle in the inner direction of the road on which the vehicle is traveling during the U-turn process and calculates the deflection distance, based on the difference between the distance invaded by the vehicle in the inner direction of the road on which the vehicle is traveling during the U-turn process and the lateral distance to the outer boundary object of the road on which the vehicle travels after making the U-turn with reference to FIG. 2.

When the deflection distance in the outer direction of the road on which the vehicle is traveling is set too large, the vehicle may invade another lane in the outer direction of the road on which the vehicle is traveling before starting to make a U-turn.

The path generator 110 may set a maximum value of the deflection distance, such that the vehicle does not invade the other lane in the outer direction of the road on which the vehicle is traveling before starting to make the U-turn and/or during the U-turn process.

As an example, the path generator 110 may set a value, obtained by subtracting a half of the width of the vehicle from a half of the width of a lane on which the vehicle starts to make the U-turn, to the maximum value of the deflection distance.

When the value obtained by subtracting the half of the width of the vehicle from the half of the width of the lane on which the vehicle starts to make the U-turn is set to the maximum value of the deflection distance, the vehicle may not invade the other lane in the outer direction of the road on which the vehicle is traveling before the vehicle is turned during the U-turn process.

As an example, the path generator 110 may calculate a distance invaded by the vehicle in the outer direction of the road on which the vehicle is traveling during the U-turn process, based on the minimum turning radius, and may set a value, obtained by subtracting the half of the width of the vehicle and the distance invaded by the vehicle in the outer direction of the road on which the vehicle is traveling during the U-turn process from the half of the width of the lane where the vehicle starts to make the U-turn, to the maximum value of the deflection distance.

When the value obtained by subtracting the half of the width of the vehicle and the distance invaded by the vehicle in the outer direction of the road on which the vehicle is traveling during the U-turn process from the half of the width of the lane on which the vehicle starts to make the U-turn is set to the maximum value of the deflection distance, the vehicle may not invade the other lane in the outer direction of the road on which the vehicle is traveling while the vehicle is turned during the U-turn process.

As an example, when the calculated deflection distance is greater than the maximum value of the deflection distance, the path generator 110 may determine that it is impossible for the vehicle to make a U-turn without colliding or being reversed.

In this case, the path generator 110 may set the deflection distance to the maximum value of the deflection distance. Furthermore, in this case, the controller 120 may perform U-turn control of the vehicle including reversing the vehicle.

As an example, the path generator 110 may determine a risk of collision with an obstacle in a direction opposite to the U-turn, based on the minimum turning radius of the vehicle. When it is determined that there is the risk of collision with the obstacle in the direction opposite to the U-turn, the path generator 110 may determine the deflection direction as the inner direction of the road on which the vehicle is traveling.

The obstacle in the direction opposite to the U-turn may include various types of obstacles such as another vehicle, a two-wheeled vehicle, a person, and a road boundary object in a direction opposite to the U-turn.

When the vehicle invades a lane on which the vehicle is currently traveling in the direction opposite to the U-turn or there is an obstacle close to the lane on which the vehicle is currently traveling in the direction opposite to the U-turn, and when the vehicle makes the U-turn while traveling along the center of the lane without deflection in the lateral direction, a collision between a rear portion of the rear bumper of the vehicle and the obstacle in the direction opposite to the U-turn may occur during the U-turn process.

As an example, assuming that the vehicle makes a U-turn while traveling along the center of the lane without deflection in the lateral direction, the path generator 110 may determine a risk of collision with the obstacle in the direction opposite to the U-turn.

To determine the risk of collision between the vehicle and the obstacle in the direction opposite to the U-turn during the U-turn process, the path generator 110 may identify whether a path drawn along the minimum turning radius by the outermost point of the rear of the vehicle on the basis of the center of an arc drawn by the vehicle during the U-turn process overlaps with the obstacle in the direction opposite to the U-turn.

As an example, the outermost point of the rear of the vehicle on the basis of the center of the arc drawn by the vehicle during the U-turn process may be a corner point at a side opposite to the U-turn on the rear bumper of the vehicle.

When the path drawn along the minimum turning radius by the outermost point of the vehicle overlaps with the obstacle in the direction opposite to the U-turn, the path generator 110 may determine that there is the risk of collision with the obstacle in the direction opposite to the U-turn.

As an example, the path generator 110 may calculate a distance invaded by the vehicle in an outer direction of a road on which the vehicle is traveling during the U-turn process, based on the minimum turning radius, and may compare the distance invaded by the vehicle in the outer direction of the road on which the vehicle is traveling during the U-turn process with a lateral distance to the obstacle in the direction opposite to the U-turn to determine the risk of collision with the obstacle in the direction opposite to the U-turn.

A description will be given in detail below of contents where the path generator 110 calculates the distance invaded by the vehicle in the outer direction of the road on which the vehicle is traveling during the U-turn process and compares the distance invaded by the vehicle in the outer direction of the road on which the vehicle is traveling during the U-turn process with the lateral distance to the obstacle in the direction opposite to the U-turn to determine the risk of collision with the obstacle in the direction opposite to the U-turn with reference to FIG. 3.

When determining the deflection direction as the inner direction of the road on which the vehicle is traveling because there is the risk of collision with the obstacle in the direction opposite to the U-turn, the path generator 110 may calculate a deflection distance in the inner direction of the road on which the vehicle is traveling.

As an example, the path generator 110 may calculate a distance invaded by the vehicle in the outer direction of the road on which the vehicle is traveling during the U-turn process, based on the minimum turning radius, and may calculate a deflection distance, based on a difference between the distance invaded by the vehicle in the outer direction of the road on which the vehicle is traveling during the U-turn process and the lateral distance to the obstacle in the direction opposite to the U-turn.

As an example, the path generator 110 may determine the difference between the distance invaded by the vehicle in the outer direction of the road on which the vehicle is traveling during the U-turn process and the lateral distance to the obstacle in the direction opposite to the U-turn as the deflection distance or may determine a distance, obtained by adding a predetermined specific margin to the difference between the distance invaded by the vehicle in the outer direction of the road on which the vehicle is traveling during the U-turn process and the lateral distance to the obstacle in the direction opposite to the U-turn, as the deflection distance.

A description will be given in detail below of contents where the path generator 110 calculates the distance invaded by the vehicle in the outer direction of the road on which the vehicle is traveling during the U-turn process and calculates the deflection distance, based on the difference between the distance invaded by the vehicle in the outer direction of the road on which the vehicle is traveling during the U-turn process and the lateral distance to the obstacle in the direction opposite to the U-turn with reference to FIG. 3.

The path generator 110 may set a maximum value of the deflection distance, such that the vehicle does not invade a centerline in the inner direction of the road on which the vehicle is traveling before starting to make the U-turn.

As an example, the path generator 110 may set a value, obtained by subtracting a half of the width of the vehicle from a half of the width of a lane on which the vehicle starts to make the U-turn, to the maximum value of the deflection distance.

When the value obtained by subtracting the half of the width of the vehicle from the half of the width of the lane on which the vehicle starts to make the U-turn is set to the maximum value of the deflection distance, the vehicle may not invade the centerline in the inner direction of the road on which the vehicle is traveling before the vehicle is turned during the U-turn process.

As an example, when the calculated deflection distance is greater than the maximum value of the deflection distance, the path generator 110 may determine that it is impossible for the vehicle to avoid the obstacle at a side opposite to the U-turn to make the U-turn.

In this case, as an example, the path generator 110 may set the maximum value of the deflection distance to the deflection distance. As another example, the controller 120 may fail to perform U-turn driving until the obstacle at the side opposite to the U-turn disappears, without performing deflection control.

As an example, the path generator 110 may calculate a distance invaded by the vehicle in the inner direction of the road on which the vehicle is traveling during the U-turn process, based on the minimum turning radius, and may compare the distance invaded by the vehicle in the inner direction of the road on which the vehicle is traveling during the U-turn process with a value obtained by subtracting the deflection distance in the inner direction of the road on which the vehicle is traveling from the lateral distance to the outer boundary object of the road on which the vehicle travels after making the U-turn to determine the risk of collision with the outer boundary object of the road on which the vehicle travels after making the U-turn.

As an example, when the distance invaded by the vehicle in the inner direction of the road on which the vehicle is traveling during the U-turn process is greater than the value obtained by subtracting the deflection distance in the inner direction of the road on which the vehicle is traveling from the lateral distance to the outer boundary object of the road on which the vehicle travels after making the U-turn, the path generator 110 may determine that there is the risk of collision with the outer boundary object of the road on which the vehicle travels after making the U-turn.

As an example, when there is the risk of collision with the outer boundary object of the road on which the vehicle travels after making the U-turn, the path generator 110 may fail to perform deflection control in the inner direction of the road on which the vehicle is traveling.

The path generator 110 may generate a U-turn path in which the deflection direction and the deflection distance are reflected.

As an example, the path generator 110 may generate an arc path, based on the minimum turning radius with respect to the center of a rear wheel axle of the vehicle, and may generate a U-turn path, in which the deflection direction and the deflection distance are reflected, which is on the basis of a path following control reference point of the vehicle.

As an example, the path generator 110 may calculate a heading direction of the vehicle, which corresponds to a point making up the arc path, may calculate a position of the path following control reference point corresponding to the point making up the arc path, with regard to the heading direction, and may generate a U-turn path, in which the deflection direction and the deflection distance are not reflected, based on the calculated position of the path following control reference point corresponding to the point making up the arc path.

As an example, the path generator 110 may reflect the deflection direction and the deflection distance in the U-turn path in which the deflection direction and the deflection distance are not reflected to generate a final U-turn path.

A description will be given in detail below of contents where the path generator 110 generates the U-turn path on the basis of the path following control reference point of the vehicle, based on the arc path with reference to FIGS. 10 and 11.

The controller 120 may control autonomous driving of the vehicle to follow the generated U-turn path.

As an example, the controller 120 may control driving, braking, and steering of the vehicle to follow the generated U-turn path. As an example, the controller 120 may control driving, braking, and steering of the vehicle, based on various path following control algorithms.

As an example, the controller 120 may stop before entering a turning section corresponding to the arc path included in the generated U-turn path and may control steering of the vehicle to maximum steering, thus controlling autonomous driving on the turning section of the vehicle.

Figure 2:
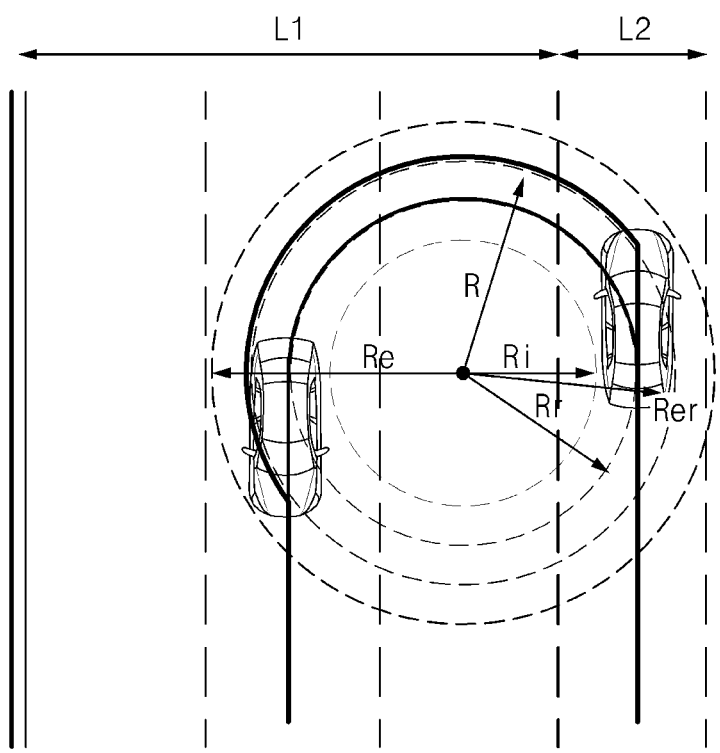
FIG. 2 is a drawing illustrating that an apparatus for generating a U-turn path of a vehicle determines a deflection direction and a deflection distance according to an embodiment of the present disclosure.

FIG. 2 is a drawing illustrating that an apparatus for generating a U-turn path of a vehicle determines a deflection direction and a deflection distance according to an embodiment of the present disclosure.

Referring to FIG. 2, when the vehicle makes a U-turn while traveling along the center of a lane without deflection in a lateral direction, based on a width $L_2$ of a lane where the U-turn is started, a width $L_i$ of a road where the U-turn is ended, and minimum turning radii R, $R_i$, $R_e$, $R_r$, and $R_{er}$ of one or more specific reference points, the apparatus for generating the U-turn path of the vehicle may determine a risk of collision with an outer boundary object of the road on which the vehicle travels after making the U-turn, a deflection direction, and a deflection distance.

As an example, when the vehicle makes a U-turn while traveling along the center of the lane without deflection in the lateral direction, the apparatus for generating the U-turn path of the vehicle may determine the risk of collision with the outer boundary object of the road on which the vehicle travels after making the U-turn, by means of Equation 1 below.

$$L_1 + \frac{L_2}{2} > R_e + R_i + \frac{w}{2} \quad \text{Equation 1}$$

Herein, $L_1$ may refer to the width of the road on which the U-turn is ended, $L_2$ may refer to the width of the lane on which the U-turn is started, $R_e$ may refer to the minimum turning radius on the basis of the corner point at the side opposite to the U-turn on the front bumper of the vehicle, $R_i$ may refer to the minimum turning radius on the basis of the innermost point of the vehicle on the basis of the center of the arc drawn by the vehicle during the U-turn process, and w may refer to the width of the vehicle.

When Equation 1 above is not established and when the vehicle makes a U-turn while traveling along the center of the lane without deflection in the lateral direction, the apparatus for generating the U-turn path of the vehicle may determine that there is the risk of collision with the outer boundary object of the road on which the vehicle travels after making the U-turn.

When there is the risk of collision with the outer boundary object on the road where the vehicle travels after making the U-turn, the apparatus for generating the U-turn path of the vehicle may determine the deflection direction as an outer direction of the road on which the vehicle is traveling.

When there is the risk of collision with the outer boundary object on the road where the vehicle travels after making the U-turn, the apparatus for generating the U-turn path of the vehicle may calculate the deflection distance in the outer direction of the road on which the vehicle is traveling, by means of Equation 2 below.

$$d_{offset} = \left[L_1 + \frac{L_2}{2}\right] - \left[R_e + R_i + \frac{w}{2}\right] \quad \text{Equation 2}$$

Herein, $d_{offset}$ may refer to the deflection distance in the outer direction of the road on which the vehicle is traveling.

The apparatus for generating the U-turn path of the vehicle may calculate the deflection distance in the outer direction of the road on which the vehicle is traveling, by means of Equation 2 above, or may calculate a value, obtained by adding a predetermined specific margin to the right side of Equation 2 above, as the deflection distance in the outer direction of the road on which the vehicle is traveling.

The apparatus for generating the U-turn path of the vehicle may calculate a maximum value of the deflection distance in the outer direction of the road on which the vehicle is traveling, by means of Equation 3 or Equation 4 below.

$$d_{offset,max} = \frac{L_2}{2} - \frac{w}{2} \quad \text{Equation 3}$$

$$d_{offset,max} = \frac{L_2}{2} - \frac{w}{2} - (R_{er} - (R_i + w)) \quad \text{Equation 4}$$

Herein, $d_{offset,max}$ may refer to the maximum value of the deflection distance in the outer direction of the road on which the vehicle is traveling, and $R_{er}$ may refer to the minimum turning radius on the basis of the corner point at the side opposite to the U-turn on the rear bumper of the vehicle.

As an example, when calculating the maximum value of the deflection distance in the outer direction of the road on which the vehicle is traveling such that the vehicle does not invade another lane in the outer direction of the road on which the vehicle is traveling before the vehicle is turned during the U-turn process, the apparatus for generating the U-turn path of the vehicle may calculate the maximum value of the deflection distance in the outer direction of the road on which the vehicle is traveling, by means of Equation 3 above.

As another example, when calculating the maximum value of the deflection distance in the outer direction of the road on which the vehicle is traveling such that the rear corner of the vehicle does not invade another lane in the outer direction of the road on which the vehicle is traveling before the vehicle is turned during the U-turn process, the apparatus for generating the U-turn path of the vehicle may calculate the maximum value of the deflection distance in the outer direction of the road on which the vehicle is traveling, by means of Equation 4 above.

The apparatus for generating the U-turn path of the vehicle may determine whether the calculated deflection distance in the outer direction of the road on which the vehicle is traveling is greater than the maximum value of the deflection distance in the outer direction of the road on which the vehicle is traveling.

When the calculated deflection distance in the outer direction of the road on which the vehicle is traveling is not greater than the maximum value of the deflection distance in the outer direction of the road on which the vehicle is traveling, the apparatus for generating the U-turn path of the vehicle may deflect an existing U-turn path by the deflection distance in the outer direction of the road on which the vehicle is traveling and may control U-turn driving of the vehicle without colliding and being reversed using maximum steering.

Figure 3:
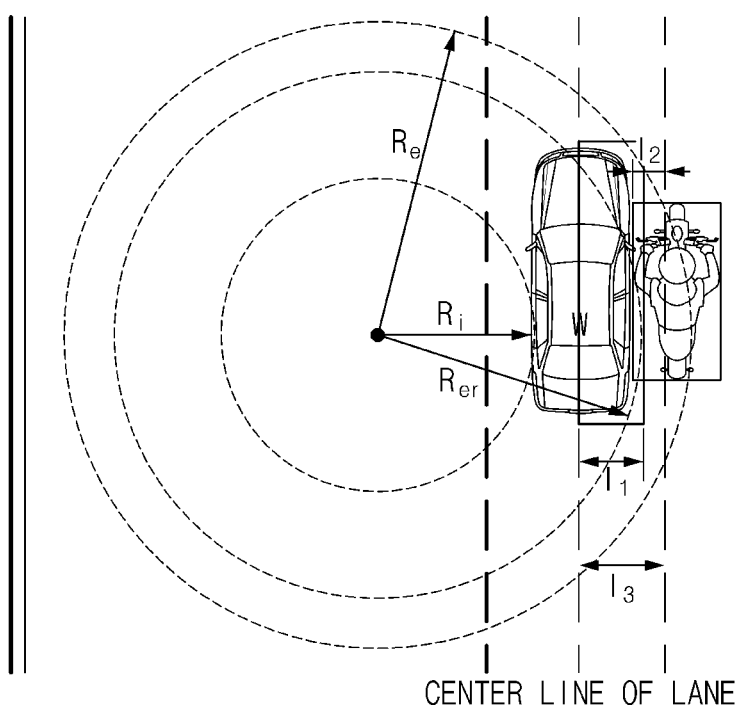
FIG. 3 is a drawing illustrating that an apparatus for generating a U-turn path of a vehicle determines a deflection direction and a deflection distance according to another embodiment of the present disclosure.

FIG. 3 is a drawing illustrating that an apparatus for generating a U-turn path of a vehicle determines a deflection direction and a deflection distance according to another embodiment of the present disclosure.

Referring to FIG. 3, when the vehicle makes a U-turn while traveling along the center of a lane without deflection in a lateral direction, based on a half $l_3$ of the width of a lane on which the U-turn is started, a distance $l_2$ in which an obstacle in a direction opposite to the U-turn invades the lane on which the U-turn is started, and a distance $l_1$ in which a specific reference point of the vehicle invades at a side opposite to the U-turn from the center of the lane on which the U-turn is started during the U-turn process, the apparatus for generating the U-turn path of the vehicle may determine a risk of collision with the obstacle in the direction opposite to the U-turn, a deflection direction, and a deflection distance.

The apparatus for generating the U-turn path of the vehicle may calculate a distance $l_1$ invaded at the side opposite to the U-turn by the specific reference point of the vehicle from the center of the lane on which the U-turn is started during the U-turn process, by means of Equation 5 below.

$$l_1 = R_{er} - R_i - \frac{w}{2} \quad \text{Equation 5}$$

Herein, $l_1$ may refer to the distance invaded at the side opposite to the U-turn by the specific reference point of the vehicle from the center of the lane on which the U-turn is started during the U-turn process, $R_{er}$ may refer to the minimum turning radius on the basis of the corner point at the side opposite to the U-turn on the rear bumper of the vehicle, $R_i$ may refer to the minimum turning radius on the basis of the innermost point of the vehicle on the basis of the center of the arc drawn by the vehicle during the U-turn process, and w may refer to the width of the vehicle.

As an example, the apparatus for generating the U-turn path of the vehicle may detect the distance $l_2$ in which the obstacle in a direction opposite to the U-turn invades the lane on which the U-turn is started, by means of a sensor provided in the vehicle.

As an example, the apparatus for generating the U-turn path of the vehicle may obtain information about the half $l_3$ of the width of the lane on which the U-turn is started, by means of information about a high definition map around the vehicle.

The apparatus for generating the U-turn path of the vehicle may subtract the distance $l_2$ in which the obstacle in the direction opposite to the U-turn invades the lane on which the U-turn is started from the half $l_3$ of the lane on which the U-turn is started to calculate a distance from the center of the lane on which the U-turn is started to the obstacle in the direction opposite to the U-turn.

The apparatus for generating the U-turn path of the vehicle may compare the calculated distance from the center of the lane where the U-turn is started to the obstacle in the direction opposite to the U-turn with the distance $l_1$ invaded at the side opposite to the U-turn by the specific reference point of the vehicle from the center of the lane where the U-turn is started during the U-turn process to determine a risk of collision with the obstacle in the direction opposite to the U-turn, when the vehicle makes the U-turn while traveling along the center of the lane without deflection in the lateral direction.

When the calculated distance from the center of the lane where the U-turn is started to the obstacle in the direction opposite to the U-turn is less than the distance $l_1$ invaded at the side opposite to the U-turn by the specific reference point of the vehicle from the center of the lane where the U-turn is started during the U-turn process, the apparatus for generating the U-turn path of the vehicle may determine that there is the risk of collision with the obstacle in the direction opposite to the U-turn.

When there is the risk of collision with the obstacle in the direction opposite to the U-turn, the apparatus for generating the U-turn path of the vehicle may determine the deflection direction as an inner direction of the road on which the vehicle is traveling.

When there is the risk of collision with the obstacle in the direction opposite to the U-turn, the apparatus for generating the U-turn path of the vehicle may calculate a deflection distance in the inner direction of the road on which the vehicle is traveling, by means of Equation 6 below.

$$d_{offset} = (l_1 + l_2) - l_3 \qquad \text{Equation 6}$$

Herein, $d_{offset}$ may refer to the deflection distance in the inner direction of the road on which the vehicle is traveling, $l_2$ may refer to the distance in which the obstacle in the direction opposite to the U-turn invades the lane where the U-turn is started, and $l_3$ may refer to the half of the width of the lane where the U-turn is started.

The apparatus for generating the U-turn path of the vehicle may calculate a maximum value of the deflection distance in the inner direction of the road on which the vehicle is traveling, by means of Equation 7 below.

$$d_{offset, max} = l_3 - \frac{w}{2} \qquad \text{Equation 7}$$

Herein, $d_{offset,max}$ may refer to the maximum value of the deflection distance in the inner direction of the road on which the vehicle is traveling.

The apparatus for generating the U-turn path of the vehicle may calculate the maximum value of the deflection distance in the inner direction of the road on which the vehicle is traveling, by means of Equation 7 above, such that the vehicle does not invade the centerline in the inner direction of the road on which the vehicle is traveling before being turned during the U-turn process.

The apparatus for generating the U-turn path of the vehicle may determine whether the calculated deflection distance in the inner direction of the road on which the vehicle is traveling is greater than the maximum value of the deflection distance in the inner direction of the road on which the vehicle is traveling.

Furthermore, the apparatus for generating the U-turn path of the vehicle may determine a risk of collision with a road boundary object in the inner direction of the road on which the vehicle is traveling, when deflecting and controlling the vehicle in the inner direction of the road on which the vehicle is traveling, by means of Equation 8 below.

$$\left[ L_1 + \frac{L_2}{2} - d_{offset} \right] > \left[ R_e + R_i + \frac{w}{2} \right] \qquad \text{Equation 8}$$

Herein, $L_1$ may refer to the width of the road where the U-turn is ended, $L_2$ may refer to the width of the lane where the U-turn is started, $d_{offset}$ may refer to the deflection distance in the inner direction of the road on which the vehicle is traveling, $R_e$ may refer to the minimum turning radius on the basis of the corner point at the side opposite to the U-turn on the front bumper of the vehicle, $R_i$ may refer to the minimum turning radius on the basis of the innermost point of the vehicle on the basis of the center of the arc drawn by the vehicle during the U-turn process, and w may refer to the width of the vehicle.

Furthermore, when Equation 8 above is not established and when deflecting and controlling the vehicle in the lateral direction, the apparatus for generating the U-turn path of the vehicle may determine that there is the risk of collision with the road boundary object in the inner direction of the road on which the vehicle is traveling.

When the calculated deflection distance in the outer direction of the road on which the vehicle is traveling is not greater than the maximum value of the deflection distance in the outer direction of the road on which the vehicle is traveling, when deflecting and controlling the vehicle in the lateral direction, when there is no risk of collision with the road boundary object in the inner direction of the road on which the vehicle is traveling, the apparatus for generating the U-turn path of the vehicle may deflect an existing U-turn path by the deflection distance in the outer direction of the road on which the vehicle is traveling and may control U-turn driving of the vehicle without colliding and being reversed using maximum steering.

Figure 4:
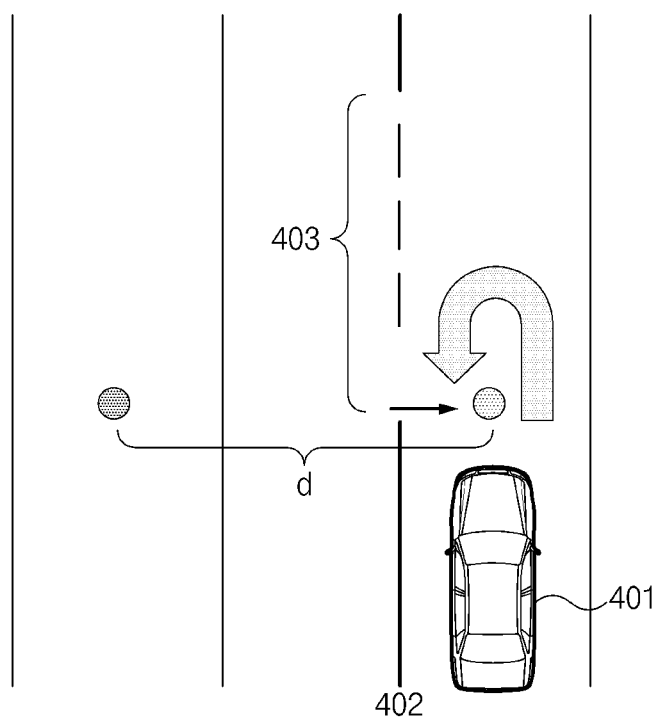
FIG. 4 is a drawing illustrating that an apparatus for generating a U-turn path of a vehicle determines a section where a U-turn is possible according to an embodiment of the present disclosure.

FIG. 4 is a drawing illustrating that an apparatus for generating a U-turn path of a vehicle determines a section where a U-turn is possible according to an embodiment of the present disclosure.

The apparatus for generating the U-turn path of the vehicle may determine a section 403 where a U-turn is possible, based on information about a surrounding high definition map, which is stored in its memory.

The information about the surrounding high definition map may include information about at least one of a line type for the road around the vehicle, a line color for the road, or whether a U-turn assigned to a specific section of the road is possible.

As an example, the apparatus for generating the U-turn path of the vehicle may determine the section 403 where the U-turn is possible, using the information about the at least one of the line type for the road around the vehicle, the line color for the road, or whether the U-turn assigned to the specified section of the road is possible, which is included in the information about the surrounding high definition map.

As an example, the apparatus for generating the U-turn path of the vehicle may obtain information about a global path of a vehicle 401 from various peripheral devices of the vehicle 401. As an example, the various peripheral devices may include navigation.

As an example, the apparatus for generating the U-turn path of the vehicle may determine the section 403 where the U-turn is possible, using the information about the surrounding high definition map, based on information about a global path to a destination of the vehicle 401.

As an example, the apparatus for generating the U-turn path of the vehicle may determine a point of the foot of perpendicular, from a point where the section 403 where the U-turn is possible is started in a driving direction of the vehicle 401 to the centerline of an ego-lane (a lane where the U-turn is started), as a start point of an arc path.

The lane where the U-turn is started may be determined as a lane closest to a centerline 402 on a road on which the vehicle 401 is traveling.

Figure 5A:
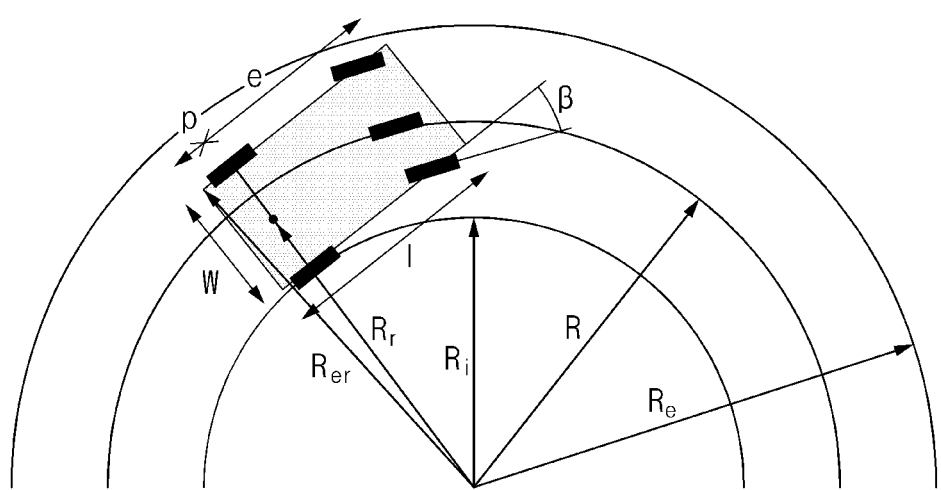
FIGS. 5A, 5B, and 5C are drawings illustrating that an apparatus for generating a U-turn path of a vehicle calculates a minimum turning radius according to an embodiment of the present disclosure.
Figure 5B:
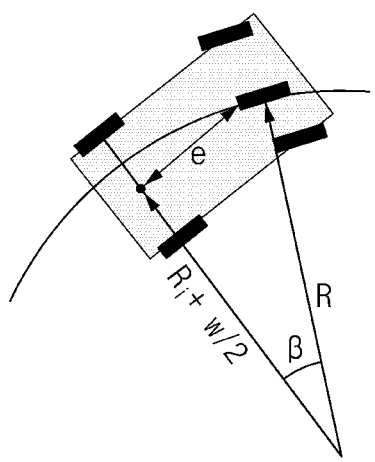
Figure 5C:
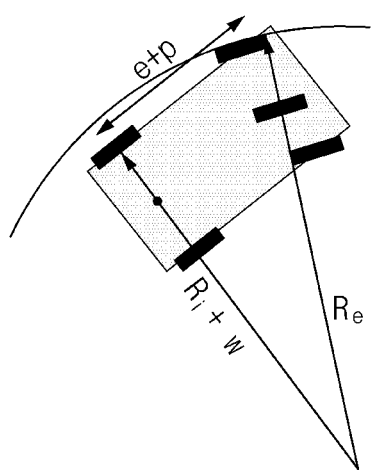

FIGS. 5A to 5C are drawings illustrating that an apparatus for generating a U-turn path of a vehicle calculates a minimum turning radius according to an embodiment of the present disclosure.

The apparatus for generating the U-turn path of the vehicle may calculate a minimum turning radius corresponding to a specific point of the vehicle with regard to a kinematic characteristic of the vehicle.

As an example, the apparatus for generating the U-turn path of the vehicle may calculate the minimum turning radius corresponding to the specific point of the vehicle, based on Equation 9 below.

$$R = \frac{e}{\sin \beta} \qquad \text{Equation 9}$$

$$R_i = \sqrt{R^2 - e^2} - \frac{w}{2} = \frac{e}{\tan \beta} - \frac{w}{2}$$

$$R_e = \sqrt{(R_i + w)^2 + (e + p)^2}$$

$$R_r = R_i + \frac{w}{2}$$

$$R_{er} = \sqrt{(R_i + w)^2 + p^2}$$

Herein, R may refer to the minimum turning radius calculated on the basis of the center point of the front wheel axle, e may refer to the wheelbase, and β may refer to the maximum steering angle.

$R_i$ may refer to the minimum turning radius calculated on the basis of the inner rear wheel and w may refer to the vehicle width.

$R_e$ may refer to the minimum turning radius calculated on the basis of the outermost point of the front bumper and p may refer to the overhang of the vehicle. The overhang may refer to the distance between the front wheel axle of the vehicle and the front end of the vehicle or the distance between the rear wheel axle of the vehicle and the rear end of the vehicle.

$R_r$ may refer to the minimum turning radius calculated on the basis of the center point of the rear wheel axle.

$R_{er}$ may refer to the minimum turning radius calculated on the basis of the outermost point of the rear bumper.

According to an embodiment, the apparatus for generating the U-turn path of the vehicle may calculate the minimum turning radius on the basis of various points of the vehicle, for example, R, $R_i$, $R_e$, $R_r$, or $R_{er}$ defined in Equation 9 above and may calculate a U-turn path based on the calculated minimum turning radius.

Figure 6:
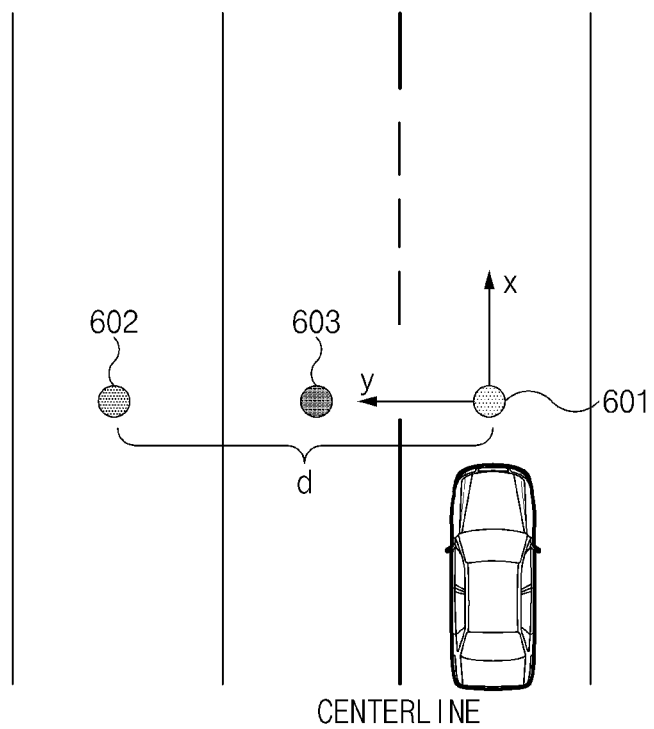
FIG. 6 is a drawing illustrating that an apparatus for generating a U-turn path of a vehicle calculates the center of an arc path according to an embodiment of the present disclosure.

FIG. 6 is a drawing illustrating that an apparatus for generating a U-turn path of a vehicle calculates the center of an arc path according to an embodiment of the present disclosure.

The apparatus for generating the U-turn path of the vehicle may determine a point of the foot of perpendicular, from a point where a section where a U-turn is possible is started to the centerline of a lane where the U-turn is started, as a start point 601 of an arc path.

The apparatus for generating the U-turn path of the vehicle may set the start point 601 of the are path to the origin, may set an existing driving direction to an x-axis, and may set a direction of a lane where the U-turn is ended, which is perpendicular to the x-axis, to a y-axis, thus calculating the are path and a U-turn path.

The apparatus for generating the U-turn path of the vehicle may calculate a point, the distance of which is away from the start point 601 of the are path in a lateral direction (or a y-axis direction) by two times the minimum turning radius, as an end point 602 of the are path.

Furthermore, the apparatus for generating the U-turn path of the vehicle may calculate a midpoint 603 between the start point 601 of the are path and the end point 602 of the are path and may generate an arc path such that the calculated midpoint 603 or a point having the same y coordinate as the calculated midpoint 603 becomes the center of the are path. At this time, a distance between the start point 601 of the are path and the end point 602 of the are path may be d.

Figure 7:
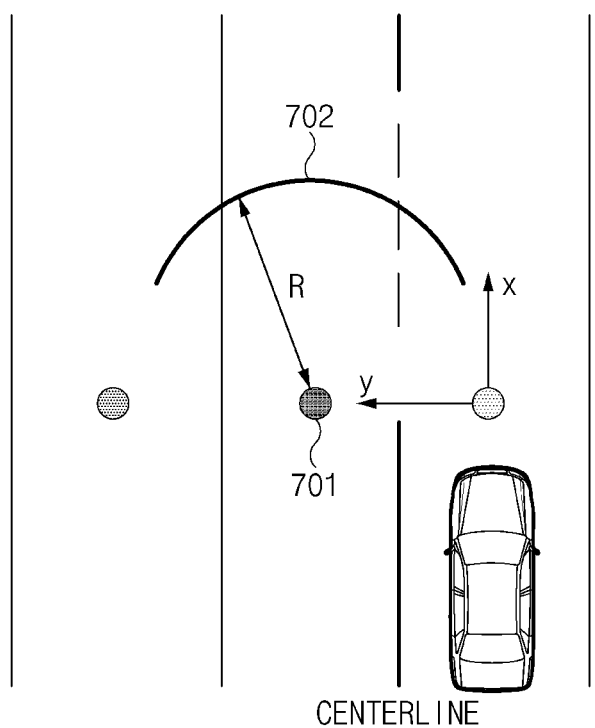
FIG. 7 is a drawing illustrating that an apparatus for generating a U-turn path of a vehicle calculates a radius of an arc path according to an embodiment of the present disclosure.

FIG. 7 is a drawing illustrating that an apparatus for generating a U-turn path of a vehicle calculates a radius of an arc path according to an embodiment of the present disclosure.

The apparatus for generating the U-turn path of the vehicle may determine a radius R of an are path 702.

As an example, the apparatus for generating the U-turn path of the vehicle may determine a minimum turning radius calculated on the basis of a midpoint of a rear wheel axle of the vehicle as the radius R of the are path 702.

The apparatus for generating the U-turn path of the vehicle may first calculate a radius R of an are path to be generated and an arc path center 701.

Figure 8:
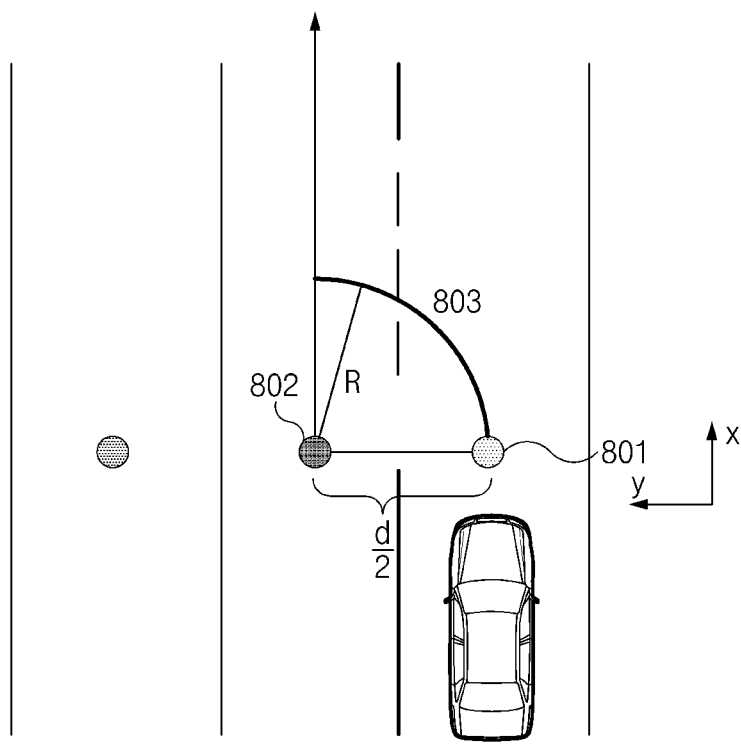
FIG. 8 is a drawing illustrating that an apparatus for generating a U-turn path of a vehicle generates an arc path according to an embodiment of the present disclosure.

FIG. 8 is a drawing illustrating that an apparatus for generating a U-turn path of a vehicle generates an arc path according to an embodiment of the present disclosure.

The apparatus for generating the U-turn path of the vehicle may calculate half an arc path 803 in the range of 0<y<d/2 from a start point 801 of an arc path.

The apparatus for generating the U-turn path of the vehicle may generate half the are path 803 in a range where the y coordinate is less than or equal to a y coordinate (d/2)

of a midpoint 802 between the start point 801 of the arc path and an end point of the arc path and is greater than or equal to a y coordinate of the start point 801 of the arc path.

As an example, the apparatus for generating the U-turn path of the vehicle may generate half the arc path 803 by means of Equation 10 below, which is an equation of half the arc path 803 which is calculated according to the calculated center of the arc path and the radius of the arc path.

$$x = \sqrt{R^2 - \left(y - \frac{d}{2}\right)^2}$$ Equation 10

Herein, x may refer to the x coordinate of the specific point of half the arc path 803, R may refer to the radius of half the arc path 803, y may refer to the y coordinate of the specific point of half the arc path 803, and d may refer to the distance between the start point and the end point of the arc path.

Half the arc path 803 calculated by means of the description of FIG. 8 may be a half of the entire arc path.

Figure 9:
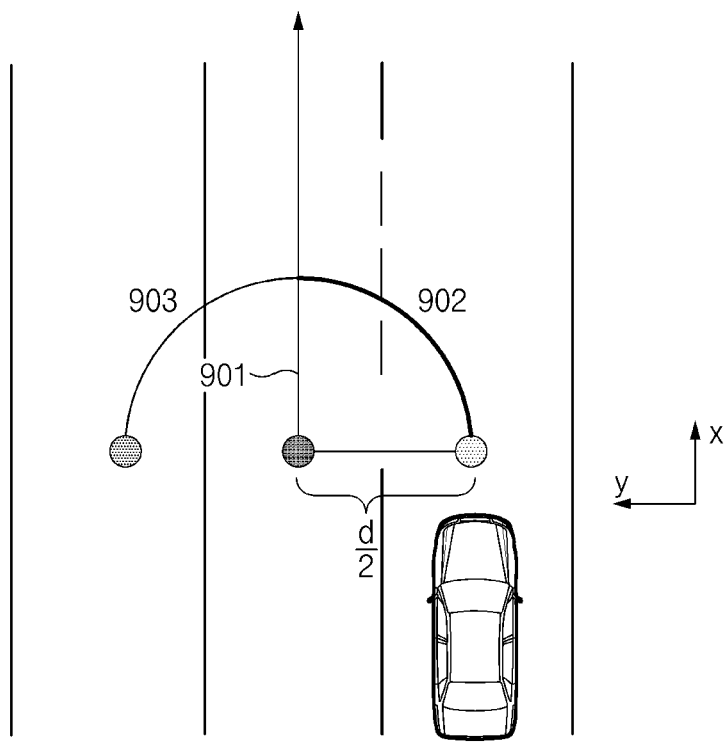
FIG. 9 is a drawing illustrating that an apparatus for generating a U-turn path of a vehicle generates a symmetric path symmetrical to an arc path according to an embodiment of the present disclosure.

FIG. 9 is a drawing illustrating that an apparatus for generating a U-turn path of a vehicle generates a symmetric path symmetrical to an arc path according to an embodiment of the present disclosure.

As an example, the apparatus for generating the U-turn path of the vehicle may first generate half an arc path 902 in a range where the y coordinate is less than or equal to the y coordinate (d/2) of a midpoint between a start point and an end point of the arc path.

The apparatus for generating the U-turn path of the vehicle may generate a symmetric path 903 where half the generated arc path 902 is symmetrical with respect to a straight line 901 where the y coordinate is d/2.

Furthermore, the apparatus for generating the U-turn path of the vehicle may generate an arc path where half the arc path 902 and the symmetric path 903 are added to each other.

As another example, the apparatus for generating the U-turn path of the vehicle may generate an arc path at a time in the range of 0<y<d from the beginning, without separately generating half the arc path 902 and the symmetric path 903.

Figure 10:
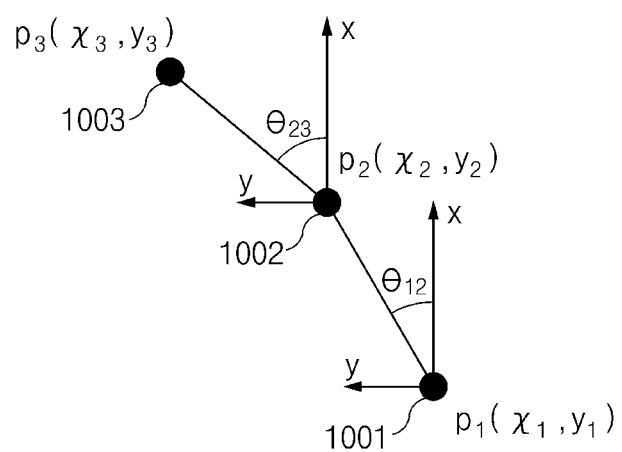
FIG. 10 is a drawing illustrating that an apparatus for generating a U-turn path of a vehicle calculates a heading direction of the vehicle corresponding to a point making up an arc path according to an embodiment of the present disclosure.

FIG. 10 is a drawing illustrating that an apparatus for generating a U-turn path of a vehicle calculates a heading direction of the vehicle corresponding to a point making up an arc path according to an embodiment of the present disclosure.

Point $p_1$ 1001, point $p_2$ 1002, and point $p_3$ 1003 may be examples of three points adjacent to each other, which make up an arc path.

The apparatus for generating the U-turn path of the vehicle may calculate a straight slope of a direction towards a next point $p_{i+1}$ adjacent to each point $p_i$ making up the arc path.

As an example, the apparatus for generating the U-turn path of the vehicle may calculate a value, obtained by dividing a difference between the y coordinate of each point $p_i$ and the y coordinate of the next point $p_{i+1}$ adjacent to each point $p_i$ by a difference between the x coordinate of each point $p_i$ and the x coordinate of the next point $p_{i+1}$ adjacent to each point $p_i$, as a slope and may calculate an angle $\theta_{i,i+1}$ which has the calculated slope as a tangent value.

As an example, the apparatus for generating the U-turn path of the vehicle may calculate a straight slope tan($\theta_{12}$) in a direction towards point $p_2$ 1002 from point $p_1$ 1001 and may calculate an angle $\theta_{12}$ corresponding to the slope. As an example, the apparatus for generating the U-turn path of the vehicle may calculate a straight slope tan($\theta_{23}$) in a direction towards point $p_3$ 1003 from point $p_2$ 1002 and may calculate an angle $\theta_{23}$ corresponding to the slope.

As an example, the apparatus for generating the U-turn path of the vehicle may calculate an angle $\theta_2$ indicating a heading direction of a vehicle, which corresponds to point $p_2$ 1002, by obtaining an average of the angle $\theta_{12}$ and the angle $\theta_{23}$.

In other words, the apparatus for generating the U-turn path of the vehicle may calculate the angle $\theta_2$ indicating the heading direction of the vehicle, which corresponds to point $p_2$ 1002, the angle $\theta_{12}$, and the angle $\theta_{23}$ by means of Equation 11 below.

$$\theta_2 = \frac{(\theta_{12} + \theta_{23})}{2},\ \theta_{12} = \tan^{-1}\frac{y_2 - y_1}{x_2 - x_1},$$
$$\theta_{23} = \tan^{-1}\frac{y_3 - y_2}{x_3 - x_2}$$ Equation 11

Herein, $x_1$ may refer to the x coordinate of point $p_1$ 1001, $y_1$ may refer to the y coordinate of point $p_1$ 1001, $x_2$ may refer to the x coordinate of point $p_2$ 1002, $y_2$ may refer to the y coordinate of point $p_2$ 1002, $x_3$ may refer to the x coordinate of point $p_3$ 1003, and $y_3$ may refer to the y coordinate of point $p_3$ 1003.

Making generalizations about it, the apparatus for generating the U-turn path of the vehicle may calculate an angle $\theta_i$ indicating the heading direction of the vehicle, which corresponds to point $p_i$, by obtaining an average of the angle $\theta_{i-1,i}$ and the angle $\theta_{i,i+1}$ with respect to any natural number i.

As another example, the apparatus for generating the U-turn path of the vehicle may simply use the angle $\theta_i$ indicating the heading direction of the vehicle, which corresponds to point $p_i$, as the angle $\theta_{i-1,i}$ or the angle $\theta_{i,i+1}$ without change.

Only the three points are exemplified in the present drawing, but calculation described for a greater number of points making up the arc path may be performed.

Furthermore, as another example which is not illustrated, the apparatus for generating the U-turn path of the vehicle may calculate a slope (or a heading direction) by differentiating a function on a coordinate system indicating the arc path.

Figure 11:
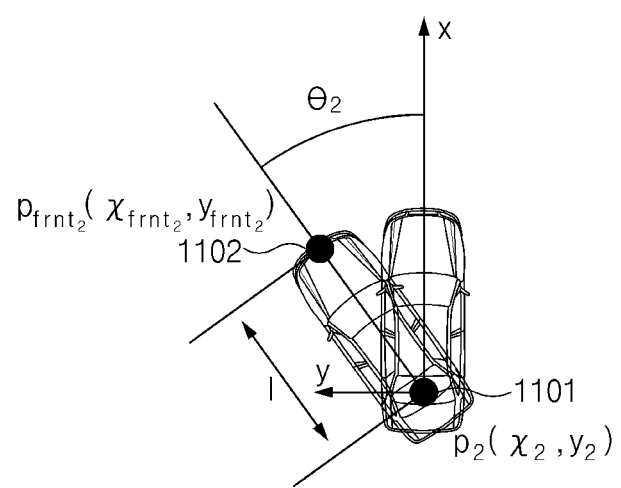
FIG. 11 is a drawing illustrating that an apparatus for generating a U-turn path of a vehicle calculates a point on a U-turn path corresponding to a point making up an arc path according to an embodiment of the present disclosure.

FIG. 11 is a drawing illustrating that an apparatus for generating a U-turn path of a vehicle calculates a point on a U-turn path corresponding to a point making up an arc path according to an embodiment of the present disclosure.

The apparatus for generating the U-turn path of the vehicle may calculate point $p_{frnt2}$ 1102 corresponding to point $p_2$ 1101 making up the arc path.

As an example, the apparatus for generating the U-turn path of the vehicle may determine a point, which is away from point $p_2$ 1101 making up the arc path by a distance l from a rear wheel axle of the vehicle to a front bumper of the vehicle in a heading direction, which is calculated from point $p_2$ 1101 making up the arc path, as point $p_{frnt2}$ 1102 corresponding to point $p_2$ 1001 making up the arc path.

As an example, the apparatus for generating the U-turn path of the vehicle may calculate point $p_{frnt2}$ 1102 corresponding to point $p_2$ 1101 making up the arc path, by means of Equation 12 below.

$$x_{frnt2} = x_2 + l \cdot \cos\theta_2$$
$$y_{frnt2} = y_2 + l \cdot \sin\theta_2$$ Equation 12

Herein, $x_{frnt2}$ may refer to the x coordinate of point $p_{frnt2}$ 1102, $y_{frnt2}$ may refer to the y coordinate of point $p_{frnt2}$ 1102, $x_2$ may refer to the x coordinate of point $p_2$ 1101, $y_2$ may refer to the y coordinate of point $p_2$ 1101, I may refer to the distance from the rear wheel axle of the vehicle to the front bumper of the vehicle, and $\theta_2$ may refer to the angle between the heading direction of the vehicle, which corresponds to point $p_2$ 1101, and the x axis.

Point $p_2$ 1101 is exemplified, but the same calculation for point $p_i$ may be performed with respect to any natural number i.

As another example of the apparatus for generating the U-turn path of the vehicle which generates the final U-turn path which is on the basis of another point rather than the center point of the front bumper, distance I may be calculated as another value rather than the distance from the rear wheel axle of the vehicle to the front bumper of the vehicle.

The apparatus for generating the U-turn path of the vehicle may calculate a point, in which point $p_{frnt2}$ 1102 corresponding to point $p_2$ 1101 making up the are path is deflected according to a deflection direction and a deflection distance, as a point on a U-turn path.

Figure 12:
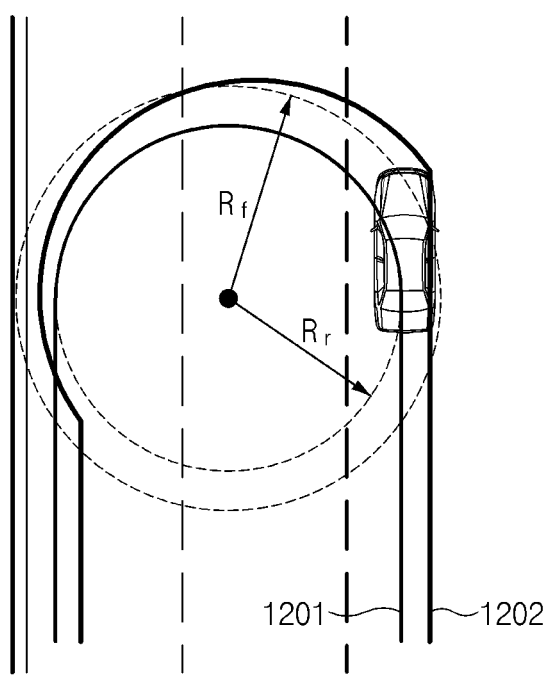
FIG. 12 is a drawing illustrating that an apparatus for generating a U-turn path of a vehicle generates a U-turn path based on an arc path according to an embodiment of the present disclosure.

FIG. 12 is a drawing illustrating that an apparatus for generating a U-turn path of a vehicle generates a U-turn path based on an arc path according to an embodiment of the present disclosure.

The apparatus for generating the U-turn path of the vehicle may generate a U-turn path 1202 corresponding to an arc path 1201.

As an example, the apparatus for generating the U-turn path of the vehicle may allow all points included in the are path 1201 to correspond to points away from all the points included in the are path 1201 by a distance from a rear wheel axle of a vehicle to a front bumper of the vehicle in a heading direction of the vehicle.

As an example, the apparatus for generating the U-turn path of the vehicle may generate the U-turn path 1202 including the points in which points respectively corresponding to all the points included in the are path 1201 are deflected according to the deflection direction and the deflection distance.

Figure 13:
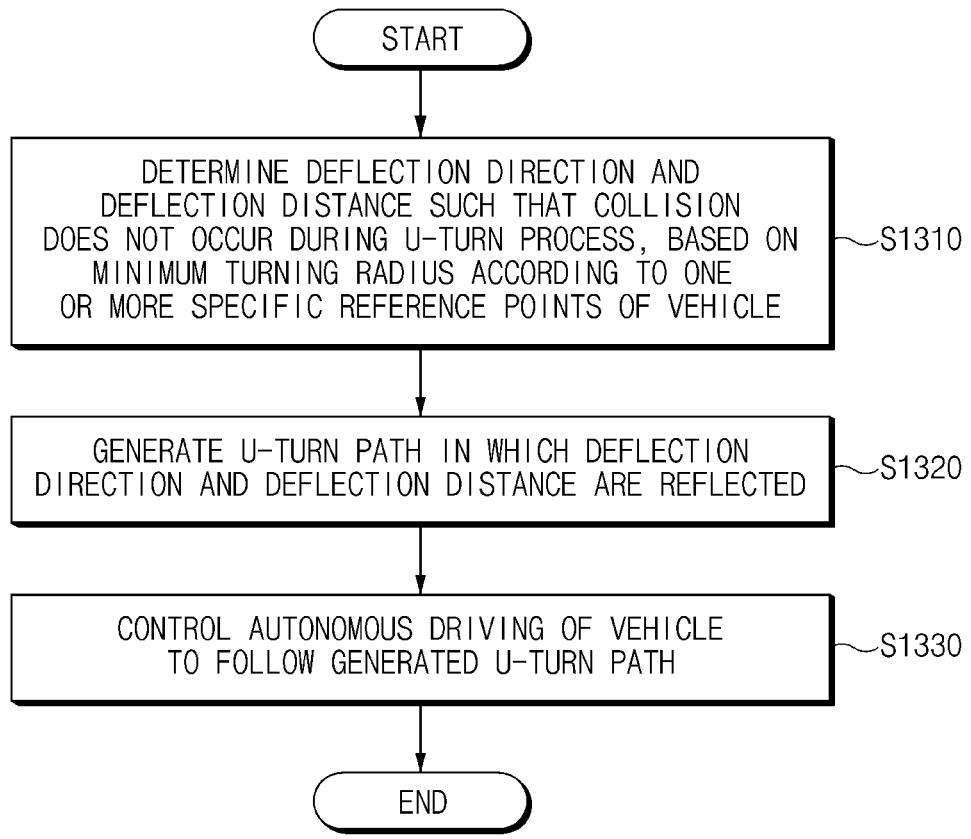
FIG. 13 is a flowchart illustrating a method for generating a U-turn of a vehicle according to an embodiment of the present disclosure.

FIG. 13 is a flowchart illustrating a method for generating a U-turn of a vehicle according to an embodiment of the present disclosure.

Referring to FIG. 13, the method for generating the U-turn of the vehicle may include determining (S1310) a deflection direction and a deflection distance such that a collision does not occur during a U-turn process, based on a minimum turning radius according to one or more specific reference points of the vehicle, generating (S1320) a U-turn path in which the deflection direction and the deflection distance are reflected, and controlling (S1330) autonomous driving of the vehicle to follow the generated U-turn path.

The determining (S1310) of the deflection direction and the deflection distance such that the collision does not occur during the U-turn process based on the minimum turning radius according to the one or more specific reference points of the vehicle may be performed by a path generator provided in the vehicle.

As an example, the determining (S1310) of the deflection direction and the deflection distance such that the collision does not occur during the U-turn process may include determining, by the path generator, a risk of collision with an outer boundary object of a road on which the vehicle travels after making a U-turn, based on the minimum turning radius and determining, by the path generator, the deflection direction as an outer direction of the road on which the vehicle is traveling, when it is determined that there is the risk of collision with the outer boundary object of the road on which the vehicle travels after making the U-turn.

As an example, the determining of the risk of collision with the outer boundary object of the road on which the vehicle travels after making the U-turn by the path generator may include calculating, by the path generator, a distance invaded by the vehicle in an inner direction of the road on which the vehicle is traveling during the U-turn process, based on the minimum turning radius, and comparing, by the path generator, the distance invaded by the vehicle in the inner direction of the road on which the vehicle is traveling during the U-turn process with a lateral distance to the outer boundary object of the road on which the vehicle travels after making the U-turn to determine the risk of collision with the outer boundary object of the road on which the vehicle travels after making the U-turn.

As an example, the determining (S1310) of the deflection direction and the deflection distance such that the collision does not occur during the U-turn process may further include calculating, by the path generator, the distance invaded by the vehicle in the inner direction of the road on which the vehicle is traveling during the U-turn process, based on the minimum turning radius, and calculating, by the path generator, the deflection distance, based on a difference between the distance invaded by the vehicle in the inner direction of the road on which the vehicle is traveling during the U-turn process and the lateral distance to the outer boundary object of the road on which the vehicle travels after making the U-turn.

As an example, the determining (S1310) of the deflection direction and the deflection distance such that the collision does not occur during the U-turn process may include determining, by the path generator, a risk of collision with an obstacle in a direction opposite to the U-turn, based on the minimum turning radius, and determining, by the path generator, the deflection direction as an inner direction of the road on which the vehicle is traveling, when it is determined that there is the risk of collision with the obstacle in the direction opposite to the U-turn.

As an example, the determining of the risk of collision with the obstacle in the direction opposite to the U-turn by the path generator may include calculating, by the path generator, a distance invaded by the vehicle in an outer direction of the road on which the vehicle is traveling during the U-turn process, based on the minimum turning radius, and comparing, by the path generator, the distance invaded by the vehicle in the outer direction of the road on which the vehicle is traveling during the U-turn process with a lateral distance to the obstacle in the direction opposite to the U-turn to determine the risk of collision with the obstacle in the direction opposite to the U-turn.

As an example, the determining (S1310) of the deflection direction and the deflection distance such that the collision does not occur during the U-turn process may further include calculating, by the path generator, the distance invaded by the vehicle in the outer direction of the road on which the vehicle is traveling during the U-turn process, based on the minimum turning radius, and calculating, by the path generator, the deflection distance, based on a difference between the distance invaded by the vehicle in the outer direction of the road on which the vehicle is traveling during the U-turn process and the lateral distance to the obstacle in the direction opposite to the U-turn.

The generating (S1320) of the U-turn path in which the deflection direction and the deflection distance are reflected may be performed by the path generator.

The controlling (S1330) of the autonomous driving of the vehicle to follow the generated U-turn path may be performed by a controller.

Figure 14:
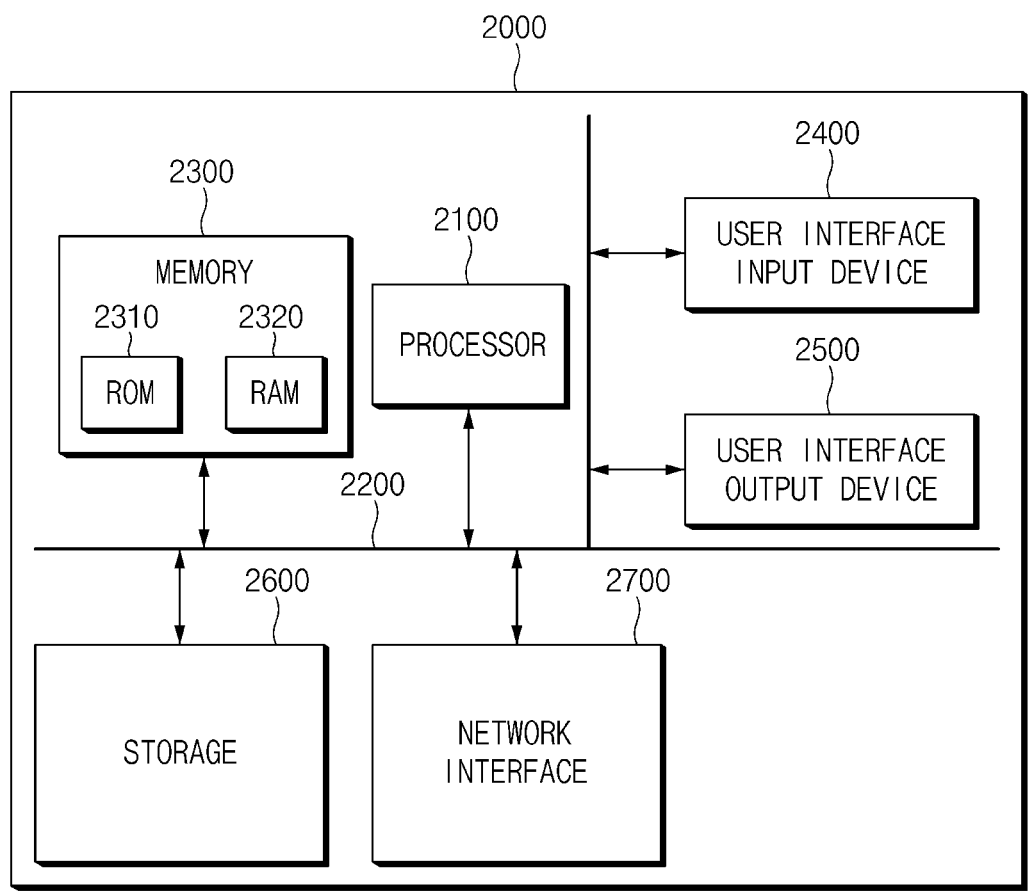
FIG. 14 is a block diagram illustrating a computing system according to an embodiment of the present disclosure.

FIG. 14 is a block diagram illustrating a computing system according to an embodiment of the present disclosure.

Referring to FIG. 14, a computing system 2000 may include at least one processor 2100, a memory 2300, a user interface input device 2400, a user interface output device 2500, storage 2600, and a network interface 2700, which are connected with each other via a bus 2200.

The processor 2100 may be a central processing unit (CPU) or a semiconductor device that processes instructions stored in the memory 2300 and/or the storage 2600. The memory 2300 and the storage 2600 may include various types of volatile or non-volatile storage media. For example, the memory 2300 may include a ROM (Read Only Memory) 2310 and a RAM (Random Access Memory) 2320.

Thus, the operations of the method or the algorithm described in connection with the embodiments disclosed herein may be embodied directly in hardware or a software module executed by the processor 2100, or in a combination thereof. The software module may reside on a storage medium (that is, the memory 2300 and/or the storage 2600) such as a RAM, a flash memory, a ROM, an EPROM, an EEPROM, a register, a hard disk, a removable disk, and a CD-ROM.

The exemplary storage medium may be coupled to the processor 2100. The processor 2100 may read out information from the storage medium and may write information in the storage medium. Alternatively, the storage medium may be integrated with the processor 2100. The processor and the storage medium may reside in an application specific integrated circuit (ASIC). The ASIC may reside within a user terminal. In another case, the processor and the storage medium may reside in the user terminal as separate components.

A description will be given of effects of the apparatus for generating the U-turn path of the vehicle and the method thereof according to an embodiment of the present disclosure.

According to at least one of the embodiments of the present disclosure, the apparatus and the method may be provided to generate a following U-turn path during autonomous driving.

Furthermore, according to at least one of the embodiments of the present disclosure, the apparatus and the method may be provided to generate a U-turn path considering a kinematic characteristic of an autonomous vehicle.

Furthermore, according to at least one of the embodiments of the present disclosure, the apparatus for generating the U-turn path of the vehicle and the method thereof may be provided to prevent a collision with a boundary object such as a curb stone at an opposite side during a U-turn process of an autonomous vehicle.

Furthermore, according to at least one of the embodiments of the present disclosure, the apparatus for generating the U-turn path of the vehicle and the method thereof may be provided to prevent a collision with an obstacle which invades a lane where a U-turn of an autonomous vehicle is started, during a U-turn process of the autonomous vehicle, when there is the obstacle.

Furthermore, according to at least one of the embodiments of the present disclosure, the apparatus for generating the U-turn path of the vehicle and the method thereof may be provided to match a path generation reference point with a following control reference point.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but are provided only for illustrative purpose. The scope of the present disclosure should be construed on the basis of the accompanying claims, and all the technical ideas within the scope equivalent to the claims should be included in the scope of the present disclosure.

What is claimed is:

1. An apparatus for generating a U-turn path of a vehicle, the apparatus comprising:
   a path generator provided in the vehicle and configured to:
      determine a deflection direction and a deflection distance to avoid a collision during a U-turn process, the deflection direction and the deflection distance being based on a minimum turning radius according to a specific reference point of the vehicle; and
      generate the U-turn path in which the deflection direction and the deflection distance are reflected; and
   a controller configured to control autonomous driving of the vehicle to follow the generated U-turn path,
   wherein the path generator is further configured to:
      determine a risk of collision with an outer boundary object of a road on which the vehicle travels after making a U-turn based on the minimum turning radius; and
      determine the deflection direction as an outer direction of the road on which the vehicle is traveling, when it is determined that there is the risk of collision with the outer boundary object of the road on which the vehicle travels after making the U-turn.

2. The apparatus of claim 1, wherein the path generator is further configured to:
   calculate a distance invaded by the vehicle in an inner direction of the road on which the vehicle is traveling during the U-turn process based on the minimum turning radius; and
   compare the distance invaded by the vehicle in the inner direction of the road on which the vehicle is traveling during the U-turn process with a lateral distance to the outer boundary object of the road on which the vehicle travels after making the U-turn to determine the risk of collision with the outer boundary object of the road on which the vehicle travels after making the U-turn.

3. The apparatus of claim 1, wherein the path generator is further configured to:
   calculate a distance invaded by the vehicle in an inner direction of the road on which the vehicle is traveling during the U-turn process based on the minimum turning radius; and
   calculate the deflection distance based on a difference between the distance invaded by the vehicle in the inner direction of the road on which the vehicle is traveling during the U-turn process and a lateral distance to the outer boundary object of the road on which the vehicle travels after making the U-turn.

4. The apparatus of claim 1, wherein the specific reference point comprises a corner point at a side opposite to the U-turn on a front bumper of the vehicle.

5. The apparatus of claim 1, wherein the path generator is further configured to:
  calculate a distance invaded by the vehicle in the outer direction of the road on which the vehicle is traveling during the U-turn process based on the minimum turning radius; and
  set a value obtained by subtracting a half of a width of the vehicle and the distance invaded by the vehicle in the outer direction of the road on which the vehicle is traveling during the U-turn process from a half of a width of a lane where the vehicle starts to make a U-turn to a maximum value of the deflection distance.

6. The apparatus of claim 1, wherein the path generator is further configured to set a value obtained by subtracting a half of a width of the vehicle from a half of a width of a lane where the vehicle starts to make a U-turn to a maximum value of the deflection distance.

7. The apparatus of claim 1, wherein the path generator is further configured to:
  determine a risk of collision with an obstacle in a direction opposite to a U-turn based on the minimum turning radius of the vehicle; and
  determine the deflection direction as an inner direction of the road on which the vehicle is traveling, when it is determined that there is the risk of collision with the obstacle in the direction opposite to the U-turn.

8. The apparatus of claim 7, wherein the path generator is further configured to:
  calculate a distance invaded by the vehicle in the outer direction of the road on which the vehicle is traveling during the U-turn process based on the minimum turning radius; and
  compares the distance invaded by the vehicle in the outer direction of the road on which the vehicle is traveling during the U-turn process with a lateral distance to the obstacle in the direction opposite to the U-turn to determine the risk of collision with the obstacle in the direction opposite to the U-turn.

9. The apparatus of claim 7, wherein the path generator is further configured to:
  calculate a distance invaded by the vehicle in the outer direction of the road on which the vehicle is traveling during the U-turn process based on the minimum turning radius; and
  calculate the deflection distance based on a difference between the distance invaded by the vehicle in the outer direction of the road on which the vehicle is traveling during the U-turn process and a lateral distance to the obstacle in the direction opposite to the U-turn.

10. The apparatus of claim 7, wherein the specific reference point comprises a corner point at a side opposite to the U-turn on a rear bumper of the vehicle.

11. The apparatus of claim 7, wherein the path generator is further configured to:
  calculate a distance invaded by the vehicle in the inner direction of the road on which the vehicle is traveling during the U-turn process based on the minimum turning radius; and
  compare the distance invaded by the vehicle in the inner direction of the road on which the vehicle is traveling during the U-turn process with a value obtained by subtracting the deflection distance from a lateral distance to the outer boundary object of the road on which the vehicle travels after making the U-turn to determine the risk of collision with the outer boundary object of the road on which the vehicle travels after making the U-turn.

12. The apparatus of claim 1, wherein the path generator is further configured to:
  generate an arc path based on the minimum turning radius based on a center of a rear wheel axle of the vehicle; and
  generate the U-turn path in which the deflection direction and the deflection distance are reflected, based on a path following control reference point of the vehicle, based on the generated arc path.

13. A method for generating a U-turn path of a vehicle, the method comprising:
  determining a deflection direction and a deflection distance to avoid a collision during a U-turn process, the deflection direction and the deflection distance being based on a minimum turning radius according to a specific reference point of the vehicle;
  generating the U-turn path in which the deflection direction and the deflection distance are reflected; and
  controlling autonomous driving of the vehicle to follow the generated U-turn path,
  wherein determining the deflection direction and the deflection distance comprises:
    determining a risk of collision with an outer boundary object of a road on which the vehicle travels after making a U-turn based on the minimum turning radius; and
    determining the deflection direction as an outer direction of the road on which the vehicle is traveling, when it is determined that there is the risk of collision with the outer boundary object of the road on which the vehicle travels after making the U-turn.

14. The method of claim 13, wherein determining the risk of collision comprises:
  calculating a distance invaded by the vehicle in an inner direction of the road on which the vehicle is traveling during the U-turn process based on the minimum turning radius; and
  comparing the distance invaded by the vehicle in the inner direction of the road on which the vehicle is traveling during the U-turn process with a lateral distance to the outer boundary object of the road on which the vehicle travels after making the U-turn to determine the risk of collision with the outer boundary object of the road on which the vehicle travels after making the U-turn.

15. The method of claim 13, wherein determining the deflection direction and the deflection distance further comprises:
  calculating a distance invaded by the vehicle in an inner direction of the road on which the vehicle is traveling during the U-turn process based on the minimum turning radius; and
  calculating the deflection distance based on a difference between the distance invaded by the vehicle in the inner direction of the road on which the vehicle is traveling during the U-turn process and a lateral distance to the outer boundary object of the road on which the vehicle travels after making the U-turn.

16. The method of claim 13, wherein determining the deflection direction and the deflection distance further comprises:
  determining a risk of collision with an obstacle in a direction opposite to a U-turn based on the minimum turning radius of the vehicle; and
  determining the deflection direction as an inner direction of the road on which the vehicle is traveling, when it is determined that there is the risk of collision with the obstacle in the direction opposite to the U-turn.

17. The method of claim 16, wherein determining the risk of collision with the obstacle in the direction opposite to the U-turn comprises:
- calculating a distance invaded by the vehicle in the outer direction of the road on which the vehicle is traveling during the U-turn process based on the minimum turning radius; and
- comparing the distance invaded by the vehicle in the outer direction of the road on which the vehicle is traveling during the U-turn process with a lateral distance to the obstacle in the direction opposite to the U-turn to determine the risk of collision with the obstacle in the direction opposite to the U-turn.

18. The method of claim 16, wherein determining the deflection direction and the deflection distance further comprises:
- calculating a distance invaded by the vehicle in the outer direction of the road on which the vehicle is traveling during the U-turn process based on the minimum turning radius; and
- calculating the deflection distance based on a difference between the distance invaded by the vehicle in the outer direction of the road on which the vehicle is traveling during the U-turn process and a lateral distance to the obstacle in the direction opposite to the U-turn.

* * * * *